United States Patent [19]

Vitale

[11] Patent Number: 5,109,673
[45] Date of Patent: May 5, 1992

[54] RELATIVE GAS SPRING CONFIGURATION FREE-PISTON STIRLING CYCLE SYSTEM

[75] Inventor: Nicholas G. Vitale, Watervliet, N.Y.

[73] Assignee: Mechanical Technology Incorporated, Latham, N.Y.

[21] Appl. No.: 694,370

[22] Filed: May 1, 1991

[51] Int. Cl.⁵ .............................................. F02G 1/043
[52] U.S. Cl. ........................................ 60/520; 60/525
[58] Field of Search .................. 60/517, 520, 525, 526

[56] References Cited

U.S. PATENT DOCUMENTS 4,802,332 2/1989 Beale .................................... 60/520
4,945,726 8/1990 Beale .................................... 60/520

*Primary Examiner*—Allen M. Ostrager
*Attorney, Agent, or Firm*—Kane, Dalsimer, Sullivan, Kurucz, Levy, Eisele and Richard

[57] ABSTRACT

A Free-Piston Stirling cycle system includes a cylinder arranged within a sealed, pressurized housing. A power piston is arranged for reciprocation within or about one region of the cylinder, and a light-weight displacer, having a selected diameter is arranged for reciprocation within or about another region of the cylinder and defining with the cylinder a compression space and an expansion space. The power piston also defines with the cylinder, a gas spring space. A gas spring piston of preselected diameter couples the displacer with this gas spring space to establish a relative gas spring which generates a force to reciprocate the displacer by the relative motion between the displacer and the power piston. In accordance with this present invention the ratio of the diameter of the gas spring piston to the diameter of the displacer is made to be at least 0.50.

12 Claims, 4 Drawing Sheets

RELATIVE GAS SPRING CONFIGURATION FREE-PISTON STIRLING CYCLE SYSTEM

BACKGROUND OF THE INVENTION

Field of the Invention

The present invention relates to Stirling cycle systems, and more particularly to a new and improved Free-Piston Stirling cycle system (such as a Stirling cycle engine) of the relative gas spring type especially adapted for operation at frequencies of 50 Hz. and above. In all practical relative gas spring configuration Free-Piston Stirling systems of which I am aware, (that is, systems wherein the force required to impart motion to the displacer is generated by the relative motion between the displacer and the power piston) the ratio of the diameter of the gas spring piston to the diameter of the displacer is not more than about 0.30, and all such systems are limited to operation of no greater than 30 Hz.

I have discovered that high frequency operation (50 Hz. and above) can be achieved in a mechanically simple, relative gas spring configuration Free-Piston Stirling system by making the ratio of the diameter of the gas spring piston to the diameter of the displacer at least 0.50. Accordingly, it is to be understood that the present invention is applicable to a wide range of designs of relative gas spring Free-Piston Stirling systems, since the important and novel aspects of this present invention lie in the arrangement and construction of such a relative gas spring configuration Free-Piston Stirling system wherein the ratio of the diameter of the gas spring piston to the diameter of the displacer is made to be at least 0.50. The invention is especially useful in the "nested" design of Stirling System, such as that shown and described, for example, in patent application Ser. No. 484,216, Filed Feb. 23, 1990 (1242-105/MTI 10-D-335) entitled "Stirling Free Piston Cryocooler", assigned to the same assignee as this present invention, and which description is incorporated herein by reference.

Description of the Prior Art

Basic Stirling engine principals of operation are set forth in a text entitled "Stirling Engines" by G. Walker, Clarendon Press, 1980. Essentially, in this regard, a Stirling cycle engine operates on the principal of heating and cooling a working fluid (gas), with the expansion and compression of the gas utilized to perform useful work. Briefly, in a Stirling cycle engine, a working gas is shuttled between two stationary volume changers or spaces, an expansion space and a compression space. This shuttling is typically performed by a displacer. A variety of design are illustrated in the aforenoted text with their attendant advantages. The Free-Piston Stirling engine is desirable for a number of reasons, including that it is self-starting and can be pressurized and enclosed within a hermetically sealed housing where no external gas seal is required.

From the aspect of simplicity, Free-Piston Stirling cycle systems offer advantages, especially for use as pumps, compressors, electrical power generators, cryocoolers, and the like. The operation of a Free-Piston Stirling engine is described in the foregoing Walker text, and is now well known in the art. One embodiment of a known prior art relative gas spring configuration Free-Piston Stirling engine system is shown and described in more detail in U.S. Pat. No. Re. 30,176.

Mechanically, the simplest Free-Piston Stirling engine configuration is of the type wherein the force required to impart motion to the displacer is generated by the relative motion between the displacer and the power piston. Such a Free-Piston Stirling system is referred to herein as being of the "relative gas spring configuration." The foregoing relative gas spring configuration Free-Piston Stirling system, however, while providing a desirable, mechanically simple configuration is limited to low frequency operation, that is, to frequencies no greater than 30 Hz.

To overcome this operating frequency limitation, Free-Piston Stirling systems of an "absolute gas spring configuration" have been devised. In such absolute gas spring configuration Free-Piston Stirling systems a stationary support is provided between the displacer and the power piston such that the spring force required to reciprocate the displacer is generated by the relative motion between the displacer and the stationary housing. One embodiment of a prior art absolute gas spring configuration Free-Piston Stirling engine system is shown and described in detail in U.S. Pat. No. 4,387,567, which is assigned to the same assignee as the present invention.

Accordingly, prior art relative gas spring configuration Free-Piston Stirling engine systems while being especially desirable because they are so mechanically simple, are limited to low frequency operation (not over 30 Hz.). Absolute gas spring configuration Free-Piston Stirling systems, on the other hand, while allowing for operation at higher frequencies (that is 50 Hz. and above) are mechanically more complex because of the need for a stationary support between the displacer and the power piston. Also, it was found that such absolute gas spring configuration Free-Piston Stirling engine systems require an additional gas spring for proper operation above 45 Hz., further complicating the manufacturing process and requiring close clearance gas bearings and clearance seals. Although long desired, until the present invention it has not been possible to achieve high frequency operation in a mechanically simple, relative gas spring configuration Free-Piston Stirling system.

OBJECTIVES AND SUMMARY OF THE INVENTION

It is an objective of this invention, therefore, to provide a Free-Piston Stirling system of mechanically simple, relative gas spring configuration which obviates the heretofore encountered operating frequency limitation of no greater than 30 Hz.

It is another objective of this invention to provide a high performance, high frequency (50 Hz. and above), low cost, and long life, relative gas spring configuration Free-Piston Stirling system.

It is yet another objective of this invention to provide a relative gas spring configuration. Free-Piston Stirling system capable of reliable operation at a frequency, for example, in excess of 80 Hz. and employing but a single gas spring.

It is a further objective of this invention to provide a relative gas spring configuration Free-Piston Stirling system employing a single gas spring thereby simplifying manufacturing and assembly complexities, reducing cost and being capable of reliable operation of 80 Hz. and above.

In all practical relative gas spring configuration Free-Piston Stirling systems of which I am aware, the ratio of the diameter of the gas spring piston to the diameter of the displacer is about 0.30. I have discovered, however, that reliable high frequency operation (that is, 50 Hz and above), can be achieved in a mechanically simple, relative gas spring configuration Free-Piston Stirling system by making the ratio of the diameter of the gas spring piston to the diameter of the displacer at least 0.50.

Briefly stated, in accordance with one aspect of this invention the new and improved relative gas spring configuration Free-Piston Stirling cycle system comprises a pressurized sealed housing and a cylinder of selected diameter, disposed within the housing. A power piston is mounted for reciprocation within or about one region of the cylinder, and a displacer of selected diameter is mounted for reciprocation within or about another region of the cylinder. The Free-Piston Stirling system further includes a relative gas sprig means arranged and constructed to generate a force by the relative motion between the displacer and the power piston to impart movement to the displacer. The relative gas spring means comprises a gas spring spacer, and a rod coupling the displacer with the gas spring space and defining a gas spring piston which terminates at the gas spring space. The relative gas spring means is arranged and constructed so that the ratio of the diameter of the gas spring piston to the diameter of the displacer is at least 0.50.

BRIEF DESCRIPTION OF THE DRAWINGS

These and other objects, features, and many of the attendant advantages of this invention will become better understood upon a detailed reading of the following description considered in conjunction with the accompanying drawings wherein like parts in each of the several Figures are identified by the same reference numeral, and wherein.

DETAILED DESCRIPTION OF THE INVENTION

Figure 1:
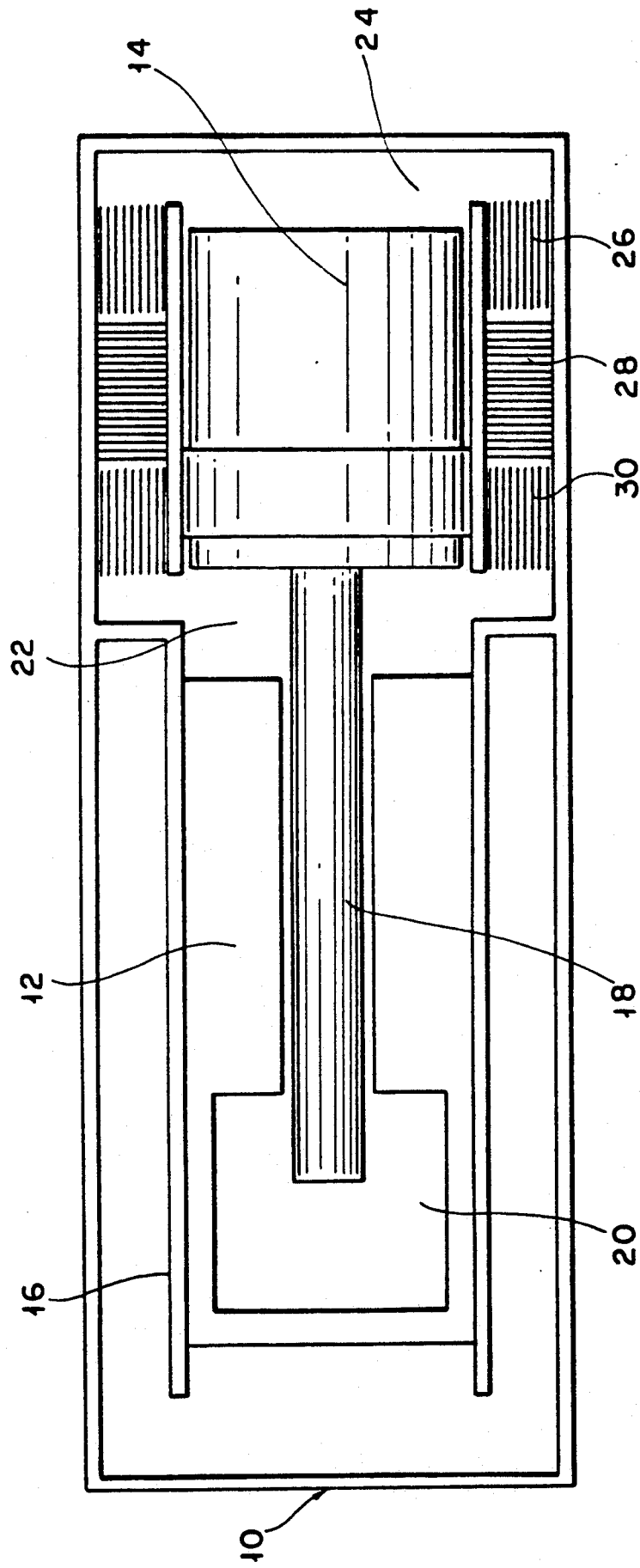
FIG. 1 is a schematic illustration of a prior art relative gas spring configuration, Free-Piston Stirling engine system wherein the force required to reciprocate the displacer is generated by the relative motion between the displacer and the power piston.

FIG. 1 is a schematic illustration of a known type of relative gas spring configuration, Free-Piston Stirling system. The system comprises a suitable sealed pressurized housing 10 and three components: a power piston 12, a light weight displacer 14, and a cylinder 16. In one configuration of Free-Piston Stirling engine, a gas spring piston rod 18 passes into power piston 12 and couples the displacer 14 with the space 20. This space 20 is referred to as the "relative gas spring space". The working space is that part of the cylinder which is above the power piston, and is divided into the compression space 22, between the piston and the displacer, and the expansion space 24, above the displacer. The system also includes a heater 26, a cooler 30, and a regenerator 28, arranged between the hot expansion space 24 and the cold compression space 22.

As previously stated, in such a prior art relative gas spring configuration Free-Piston Stirling system the spring force required to reciprocate the displacer is generated by the relative motion between the displacer 14 and the power piston 12. While mechanically simple, such relative gas spring configuration Free-Piston Stirling systems have heretofore been limited to low frequency operation. That is, to operation not over 30 Hz.

Figure 2:
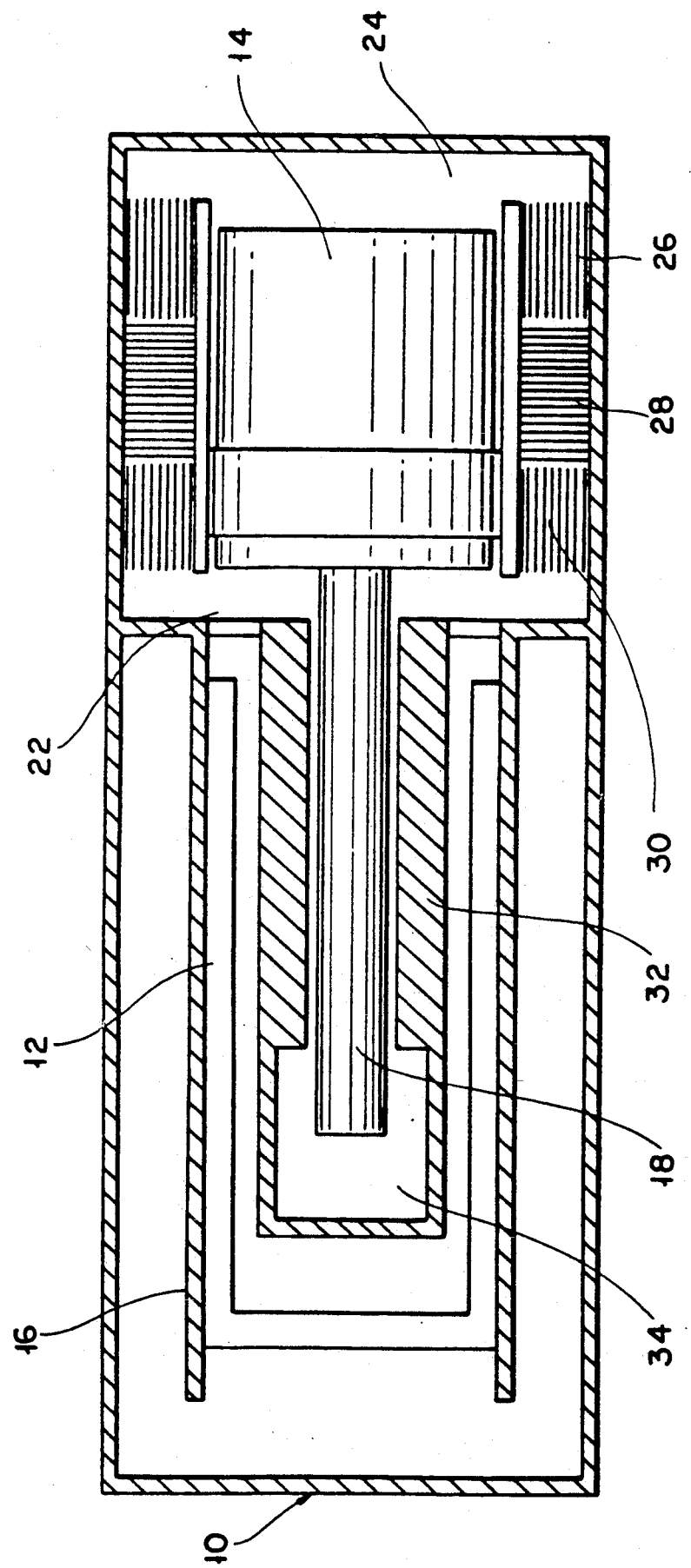
FIG. 2 is a schematic illustration of a prior art absolute gas spring configuration Free-Piston Stirling engine system wherein the force required to reciprocate the displacer is generated by the relative motion between the displacer and the stationary housing.

In FIG. 2 there is schematically illustrated a known absolute gas spring configuration, Free-Piston Stirling system. One arrangement of such an absolute gas spring configuration Free-piston Stirling system is shown and described in the foregoing referenced U.S. Pat. No. 4,387,567. The absolute gas spring configuration, Free-Piston Stirling system allows for operation at higher frequency than that of the relative gas spring configuration system illustrated in FIG. 1. The system illustrated in FIG. 2 similarly comprises a sealed pressurized housing 10, a power piston 12, a light weight displacer 14, and a cylinder. 16. In this absolute gas spring configuration Free-Piston Stirling system, however, a stationary support 32 is provided between the displacer 12 and the stationary housing. A gas spring piston rod 18 couples the displacer 14 with the space 34, which space 34 is coupled to the stationary housing 10 by means of stationary support 32. In this absolute gas spring configuration Stirling system, therefore, the force required to reciprocate the displacer is generated by the relative motion between the displacer and the stationary housing. Higher frequency operation is achieved with such an arrangement but at the expense of increased mechanical complexity and cost.

Figure 3:
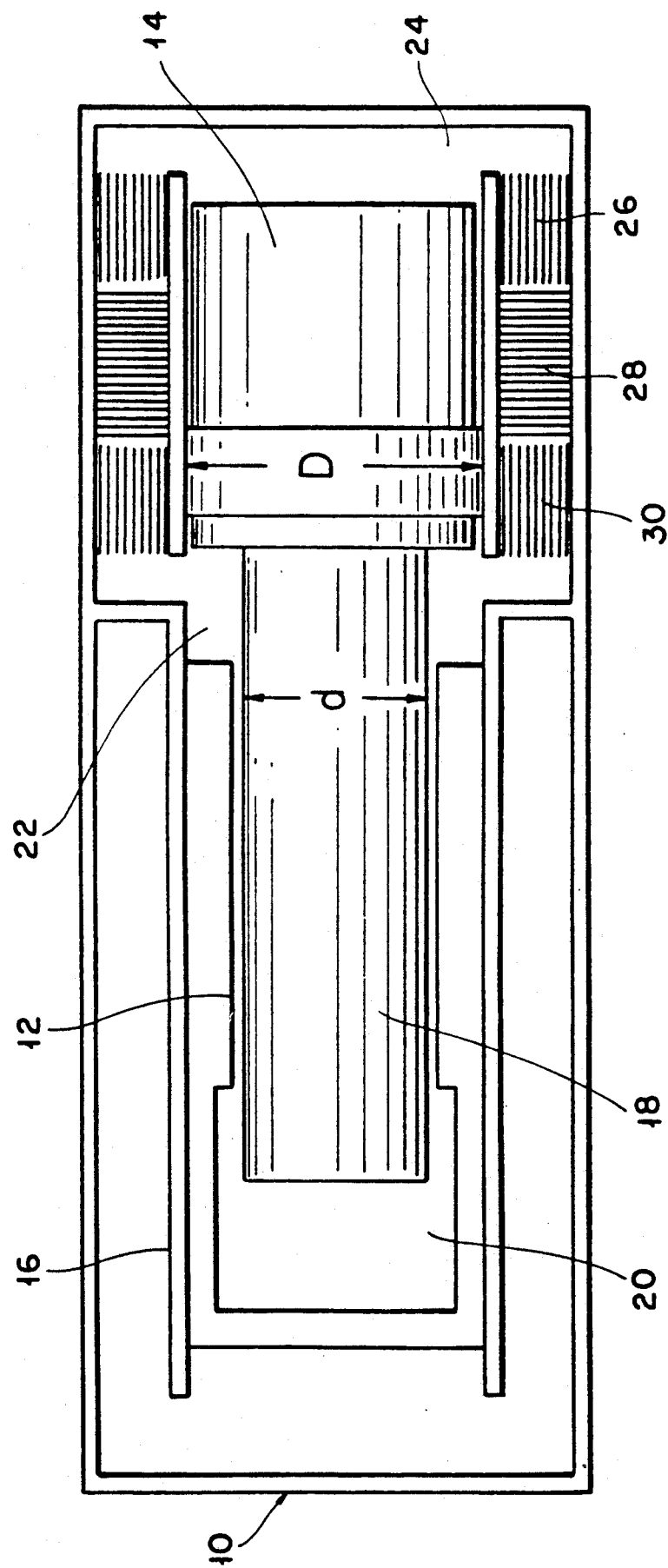
FIG. 3 is a schematic illustration of a relative gas spring configuration, Free-Piston Stirling system in accordance with this present invention wherein the force required to reciprocate the displacer is generated by the relative motion between the displacer and the power piston, and wherein the ratio of the diameter of the gas spring piston, to the diameter of the displacer is at least 0.50.

FIG. 3 schematically illustrates a relative gas spring configuration Free-Piston Stirling system in accordance with the present invention. The new and improved system of the present invention is similar in general construction to that illustrated in FIG. 1, in that there is no stationary support 32 between the displacer 12 and the stationary housing. Accordingly, the system shown in FIG. 3 is a relative gas spring configuration Free-Piston Stirling system wherein the force required to reciprocate the displacer is generated by the relative motion between the displacer and the power piston. The novel and important difference between the arrangement of the present invention and that of the arrangement shown in FIG. 1 is that in the relative gas spring configuration Free - Piston Stirling system of this present invention the ratio of the diameter d of the gas spring piston 18 to the diameter D of the displacer 14 is made to be at least 0.50. With this larger ratio of the diameter of the gas spring piston to the diameter of the displacer, a relative gas spring configuration Free-Piston Stirling system is provided which offers ultimate mechanical simplicity and is capable of operating reliably at a frequency of 50 Hz. and above.

Figure 4:
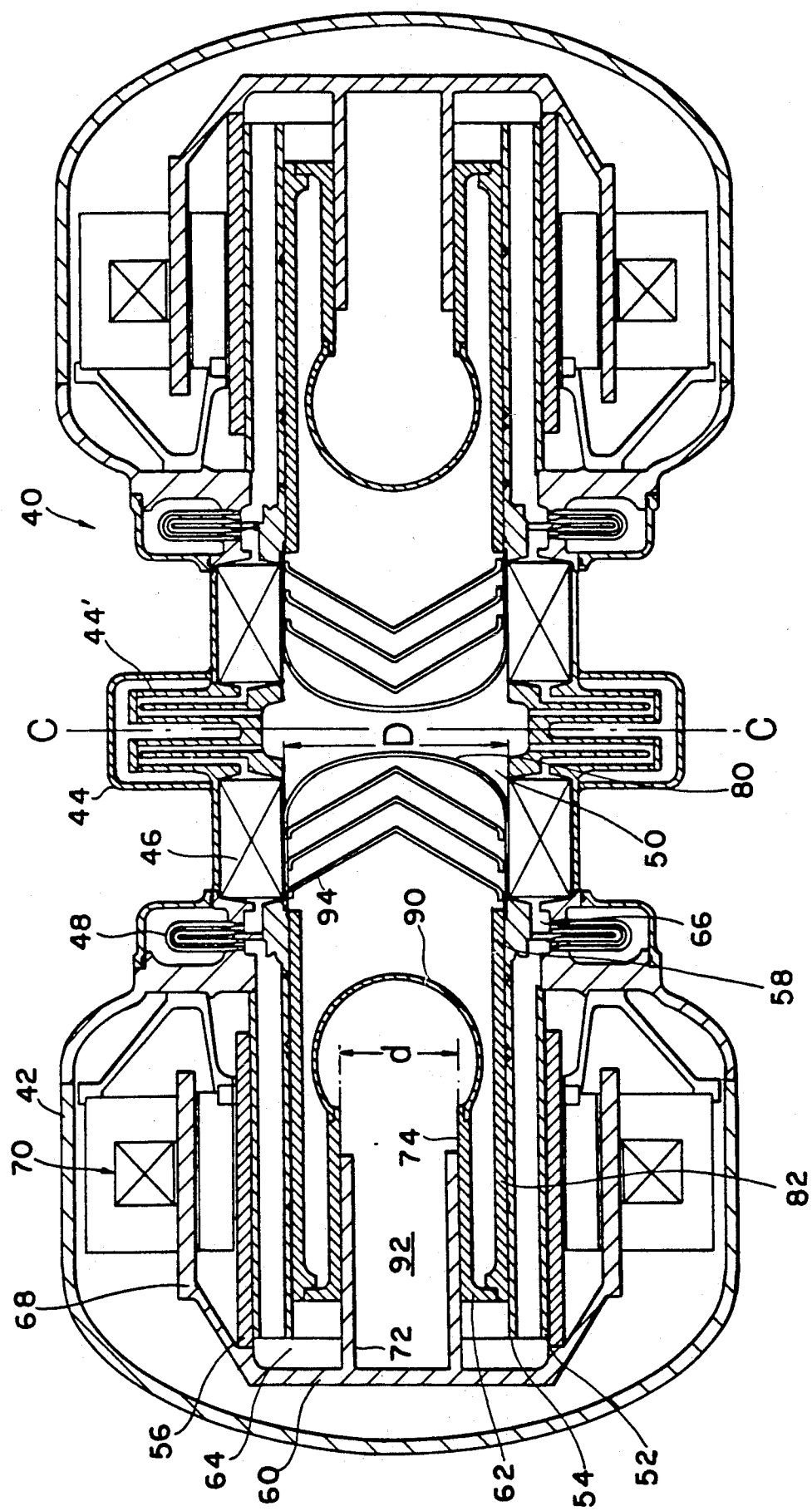
FIG. 4 is a more detailed schematic sectional view of a relative gas spring Free-Piston Stirling system, incorporating the present invention, wherein the system is arranged in an opposed configuration, and is of the "nested type design" such as shown and described in the foregoing referenced patent application Ser. No. 484,216. In such "nested" design, one reciprocating member, such as the displacer, is nested within another reciprocating member, such as the power piston; and the gas spring piston may be similarly nested. That is, a member may be mounted for reciprocation either within the cylinder, or around or about the cylinder.

In FIG. 4 there is shown a more detailed schematic sectional view of a relative gas spring Free-Piston Stirling system, incorporating the present invention wherein the system is arranged in an opposed configuration, and is of the "nested type design", such as shown and described, for example, in the foregoing referenced patent application Ser. No. 484,216. The opposed arrangement is desireable since it can achieve a better balance for the system, and the nested design provides for ease of manufacture and low cost.

Referring now to FIG. 4, a Free-Piston Stirling system 40 incorporating the present invention includes a sealed pressurized housing 42 with a central axis C—C. In the arrangement shown all components are shown disposed symmetrically about the axis C—C. For the sake of simplicity, only one side of the system is described in detail.

Within housing 42 there is provided a thermodynamic assembly including a centrally disposed annular heater section 44 with heat exchanging coils 44' which provide the heat required for the thermodynamic section and thus acts like as a heat sink for the external environment. For cryocooler applications this annular heater section may be replaced by a centrally located cold head as illustrated in the referenced patent application Ser. No. 484,216. Also within housing 42 there is an annular regenerator 46 and an annular cooler 48 disposed around a common expansion space 50. A suitable coolant such as water is circulated through the cooler 48.

The system also includes a cylinder means defined by two concentric radially spaced apart walls 52 and 54, a power piston 56, and a displacer 58. The power piston 56 is slidably mounted on the outer piston cylinder wall 52 and is provided with a cap 60. The cap 60, together with the two cylinder walls 52 and 54 and an end member 62 define the Stirling compression space 64. Compression space 64 is connected to the cooler 48 by axial passages 67.

Attached to cap 60 is the plunger 68 of a suitable electrodynamic motor 70 used to reciprocate the power piston 56. Cap 60 also supports a hollow cylindrical gas spring rod constituting a gas spring piston 72 disposed for reciprocation with respect to a gas spring cylinder 74.

The displacer 58 includes a dome head 80 disposed in the common expansion space 50. A tubular wall 82 extends rearwardly from the head 80 and is slidably disposed inside cylinder wall 54. Suitable sealing and bearing means are provided between the walls 54 and 82 and also between wall 52 and power piston 56. Suitable sealing is also provided between gas spring piston 72 and gas spring cylinder 74. One end of gas spring cylinder 74 is connected to wall 82 by end member 62. The other end is terminated by a somewhat hemispherical cap 90. Thus, gas spring piston 72, cap 60, gas spring cylinder 74, and cap 90 cooperate to define the space 92 forming a relative gas spring means, which is operative to generate the force required to impart motion to the displacer by the relative motion between the displacer and the power piston.

A plurality of conical heat shields 94 are disposed inside cap 90 to prevent radiative or convective heat exchange between the cap 90 and the rest of the Stirling system.

In accordance with this invention the ratio of the diameter d of the gas spring piston 72 to the diameter D of the displacer 58 is made to be at least 0.50. In previous relative gas spring configuration Free-Piston Stirling systems the ratio of the diameter of the gas spring piston to the diameter of the displacer has always been less than 0.30. It has been discovered that because of this larger ratio of the diameter of the gas spring piston to the diameter of the displacer, a relative gas spring configuration Free-Piston Stirling can be reliably operated at much higher frequencies (50 Hz. and above) than was previously achievable with such a mechanically simple relative gas spring configuration. A further advantage of the invention is that the displacement power input and relative gas spring are achieved in a relatively simple gas spring piston/cylinder arrangement and without the necessity for additional gas springs to achieve reliable operation at 50 Hz, and above. Free-Piston Stirling systems constructed in accordance with this invention and employing only a single gas spring have been operated reliably at above 80 Hz. Moreover, the pressure difference across the gas spring piston/cylinder seal is made much lower than in previous configurations and, therefore, the clearance for such seal can be made larger without incurring excessive losses across the seal, which allows for lower manufacturing cost.

The present invention relates to new and improved Free-Piston Stirling heat systems, for such applications as compressors, pumps, electrical power generators, cryocoolers, and other like apparatus and systems having a wide range of applications, residential, commercial and industrial. Obviously, numerous modifications may be made to the present invention without departing from the true spirit and scope of the invention as set forth in the appended claims.

What is claimed is:

1. In a Free Piston Stirling cycle system of the type including a power piston, a displacer having a diameter, an expansion space, a compression space, a gas spring space, and means coupling said displacer with said gas spring space, the improvement comprising:

a relative gas spring means arranged and constructed for generating a force to impart movement to said displacer by the relative motion between the displacer and the power piston, said gas spring means including a gas spring piston for coupling the displacer with the gas spring space, said gas spring piston having a diameter and being arranged and constructed so that the ratio of the diameter of said gas spring piston to the diameter of said displacer is at least 0.50.

2. The invention recited in claim 1 wherein said Free-Piston Stirling cycle system further comprises means for supplying thermal energy to said system and said system is arranged and constructed to operate as an engine.

3. The invention recited in claim 1 wherein said Free-Piston Stirling cycle system further includes means for driving said power piston and said system is arranged and constructed to operate as a cooler.

4. A Free-Piston type Stirling cycle system, comprising:

a housing;

cylinder means disposed within said housing and having first and second spaced apart regions;

a displacer having a selected diameter and mounted for movement with respect to a first region of said cylinder means;

a power piston mounted for movement with respect to a second region of said cylinder means and defining a compression space and a gas spring space;

a gas spring piston for coupling said displacer with said with said gas spring space; and relative gas spring means comprising said gas spring piston and said gas spring space for generating a force to impart movement to said displacer by the relative motion between said displacer and said power piston, said relative gas spring means being arranged and constructed so that the ratio of the diameter of said gas spring piston to the diameter of said displacer is at least 0.50.

5. The invention recited in claim 4 further comprising means for supplying thermal energy to said system and whereby said system is arranged and constructed to operate as an engine.

6. The invention recited in claim 4 further comprising means for driving said power piston and whereby said system is arranged and constructed to operate as a cooler.

7. The invention recited in claim 6 wherein said means for driving said power piston is an electrodynamic motor.

8. A Free-Piston type Stirling cycle system, comprising:

a housing;

cylinder means disposed within said housing and having first and second spaced apart regions;

a displacer having a selected diameter and mounted for movement with respect to said first region of said cylinder means;

a power piston mounted for movement with respect to said second region of said cylinder means and defining a compression and a gas spring space; and a rod connected with said displacer and forming a gas spring piston which terminates at said gas spring space to establish a gas spring means for coupling said displacer with said gas spring space;

said gas spring means comprising said gas spring piston and said gas spring space for generating a force to impart movement to said displacer by the relative motion between said displacer and said power piston and being further arranged and constructed so that the ratio of the diameter of said gas spring piston to the diameter of said displacer is at least 0.50.

9. A Free-Piston Stirling system, comprising:

a sealed pressurized housing having an expansion chamber disposed therein;

cylinder means disposed within said housing;

a power piston disposed for reciprocation with respect to a first region of said cylinder means;

drive means for imparting reciprocating movement to said power piston;

a displacer disposed for reciprocating with respect to a second region of said cylinder means and terminating at one end at said expansion chamber;

relative gas spring means including a gas spring piston-rod and a gas spring space within said housing for generating a force to impart motion to said displacer by the relative motion between said displacer and said power piston, said piston-rod having one end connected with said displacer and the other end constituting a gas spring piston communicating with said gas spring space and arranged and constructed so that the ratio of the diameter of said gas spring piston to the diameter of said displacer is at least 0.50.

10. The Free-Piston Stirling system recited in claim 9 wherein said power piston, relative gas spring piston, and said displacer are concentric.

11. The Free-Piston Stirling system recited in claim 9 wherein said gas spring piston comprises a tubular member mounted on said drive means for imparting reciprocating movement to said power piston.

12. The Free-Piston Stirling system recited in claim 9 wherein said drive means for imparting reciprocating movement to said power piston is an electrodynamic motor.

* * * * *